US012587561B2

(12) United States Patent
Panzner et al.

(10) Patent No.: US 12,587,561 B2
(45) Date of Patent: Mar. 24, 2026

(54) MITIGATION OF MALICIOUS ATTACKS IN SIDELINK COMMUNICATIONS

(71) Applicant: Nokia Technologies Oy, Espoo (FI)

(72) Inventors: Berthold Panzner, Munich (DE); Daniel Medina, Munich (DE); Stepan Kucera, Munich (DE)

(73) Assignee: Nokia Technologies Oy, Espoo (FI)

( * ) Notice: Subject to any disclaimer, the term of this patent is extended or adjusted under 35 U.S.C. 154(b) by 47 days.

(21) Appl. No.: 18/707,330

(22) PCT Filed: Nov. 16, 2021

(86) PCT No.: PCT/FI2021/050775
§ 371 (c)(1),
(2) Date: May 3, 2024

(87) PCT Pub. No.: WO2023/089227
PCT Pub. Date: May 25, 2023

(65) Prior Publication Data
US 2024/0422191 A1 Dec. 19, 2024

(51) Int. Cl.
*H04L 9/40* (2022.01)
*H04W 72/044* (2023.01)
*H04W 72/25* (2023.01)

(52) U.S. Cl.
CPC ....... *H04L 63/1441* (2013.01); *H04W 72/044* (2013.01); *H04W 72/25* (2023.01)

(58) Field of Classification Search
CPC . H04L 63/1441; H04L 5/0055; H04L 5/0094; H04L 2209/80; H04L 9/0891; H04W 72/044; H04W 72/25; H04W 72/40; H04W 12/122; H04W 74/0816; H04W 76/23; H04W 4/46; G06F 21/554
See application file for complete search history.

(56) References Cited

U.S. PATENT DOCUMENTS

2019/0200217 A1* 6/2019 Li .......................... H04W 12/63
2020/0229171 A1 7/2020 Khoryaev et al.
(Continued)

FOREIGN PATENT DOCUMENTS

EP 3122126 A1 1/2017
JP 2020523887 A * 8/2020 ............ H04W 72/25
(Continued)

OTHER PUBLICATIONS

Extended European Search Report received for corresponding European Patent Application No. 21964658.5, dated Mar. 20, 2025, 9 pages.
"3rd Generation Partnership Project; Technical Specification Group Radio Access Network; NR; Multiplexing and channel coding (Release 16)", 3GPP TS 38.212, V16.6.0, Jun. 2021, pp. 1-153.
(Continued)

*Primary Examiner* — Richard G Keehn
(74) *Attorney, Agent, or Firm* — Laine IP Oy

(57) ABSTRACT
There is provided an apparatus which is a first apparatus, configured to communicate with at least one second apparatus via sidelink resources associated with unmodified sidelink control information, the apparatus comprising means for: detecting a possibility of a malicious attack on the sidelink resources or receiving an instruction to modify a sidelink control information message; transmitting, to the at least one second apparatus, a modified sidelink control information message indicative of at least one secret indication.

18 Claims, 17 Drawing Sheets

(56) References Cited

U.S. PATENT DOCUMENTS

| | | | | |
|---|---|---|---|---|
| 2020/0334357 | A1* | 10/2020 | Patne | G06F 21/56 |
| 2021/0037552 | A1* | 2/2021 | Chen | H04W 72/23 |
| 2022/0330026 | A1* | 10/2022 | Kiilerich Pratas | H04W 12/122 |
| 2023/0056399 | A1* | 2/2023 | Ji | H04W 12/122 |
| 2023/0155841 | A1* | 5/2023 | Koh | H04W 12/037 713/156 |
| 2024/0259794 | A1* | 8/2024 | Elshafie | H04W 12/037 |
| 2024/0426971 | A1* | 12/2024 | Ashour | G01S 13/341 |
| 2025/0081231 | A1* | 3/2025 | Guo | H04W 72/40 |

FOREIGN PATENT DOCUMENTS

| | | | | | |
|---|---|---|---|---|---|
| KR | 20210047924 | A | * | 4/2021 | H04W 4/46 |
| KR | 20230014765 | A | * | 1/2023 | H04W 72/25 |
| WO | 2020/216340 | A1 | | 10/2020 | |
| WO | 2021/196120 | A1 | | 10/2021 | |
| WO | 2021/203974 | A1 | | 10/2021 | |

OTHER PUBLICATIONS

International Search Report and Written Opinion received for corresponding Patent Cooperation Treaty Application No. PCT/FI2021/050775, dated Jun. 2, 2022, 16 pages.

"Inter-UE coordination for Mode 2 enhancements", 3GPP TSG RAN WG1 #107-e, R1-2110862, Agenda: 8.11.1.2, Nokia, Nov. 11-19, 2021, 29 pages.

"Feature lead summary #2 for AI 8.11.1.2 Inter-UE coordination for Mode 2 enhancements", 3GPP TSG RAN WG1 Meeting #107-e, R1-2111818, Agenda: 8.11.1.2, LG Electronics, Nov. 11-19, 2021, pp. 1-31.

"3rd Generation Partnership Project; Technical Specification Group Radio Access Network; NR; Physical layer procedures for data (Release 16)", 3GPP TS 38.214, V16.7.0, Sep. 2021, pp. 1-172.

Campolo et al., "Improving Resource Allocation for beyond 5G V2X Sidelink Connectivity", 55th Asilomar Conference on Signals, Systems, and Computers, Oct. 31-Nov. 3, 2021, pp. 55-60.

* cited by examiner

Fig. 2

400

Detecting, by a first apparatus configured to communicate with at least one second apparatus via sidelink resources associated with unmodified sidelink control information, a possibility of a malicious attack on the sidelink resources or receiving an instruction to modify a sidelink control information message

410 transmitting, to the at least one second apparatus, a modified sidelink control information message indicative of at least one secret indication

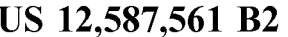
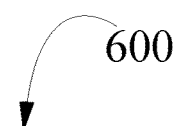
600
610
| si-NumReservedBits=4 | | | | |
|---|---|---|---|---|
| | si-NumReservedBits=3 | | | |
| | | si-NumReservedBits=2 | | |
| Bit4 | Bit3 | Bit1 | Bit0 | Time offset |
| | | 0 | 0 | 0 slot offset |
| | | 0 | 1 | 1 slot offset |
| | | 1 | 0 | 2 slots offset |
| | | 1 | 1 | 3 slots offset |
| | 0 | 0 | 0 | |
| | 0 | 0 | 1 | |
| | 0 | 1 | 0 | |
| | ... | ... | ... | ... |
| | 1 | 1 | 1 | 7 slots offset |
| ... | ... | ... | ... | ... |
| 1 | 1 | 1 | 1 | 15 slots offset |
Fig. 6

700

710

| sl-NumReservedBits=4 | | | | |
| | sl-NumReservedBits=3 | | | |
| | | sl-NumReservedBits=2 | | |
| Bit4 | Bit3 | Bit1 | Bit0 | subCH offset |
| | | 0 | 0 | 0 subCH offset |
| | | 0 | 1 | 1 subCH offset |
| | | 1 | 0 | 2 subCH offset |
| | | 1 | 1 | 3 subCH offset |
| | 0 | 0 | 0 | |
| | 0 | 0 | 1 | |
| | 0 | 1 | 0 | |
| | ... | ... | ... | ... |
| | 1 | 1 | 1 | 7 subCH offset |
| ... | ... | ... | ... | ... |
| 1 | 1 | 1 | 1 | 15 subCH offset |

1000 receiving, from a first apparatus by a second apparatus configured to communicate with the first apparatus via sidelink resources associated with unmodified sidelink control information, a modified sidelink control information message indicative of at least one secret indication

1010 interpreting the modified sidelink control information message as a warning about potential attack on the sidelink resources associated with the unmodified sidelink control information

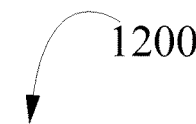

1210

| sl-NumReservedBits=4 | | | | |
|---|---|---|---|---|
| | sl-NumReservedBits=3 | | | |
| | | sl-NumReservedBits=2 | | |
| | | | | |
| Bit4 | Bit3 | Bit1 | Bit0 | indication |
| NA | NA | 0 | 0 | NA |
| NA | NA | 0 | 1 | indication that first UE (TX-UE) will monitor "garbage PSSCH" |
| NA | NA | 1 | 0 | request from first UE that second UE(s) should report attacks on "garbage PSSCH" |
| NA | NA | 1 | 1 | indication that first UE (TX-UE) will transmit additional PSSCH on offset subchannel |
| NA | 1 | 0 | 0 | indication by first UE (TX-UE) that there are no free/available secret sidelink resources |

Fig. 12

MITIGATION OF MALICIOUS ATTACKS IN SIDELINK COMMUNICATIONS

RELATED APPLICATION

This application claims priority to PCT Patent Application No. PCT/FI2021/050775, filed 16 Nov. 2021, which is incorporated herein by reference in its entirety.

FIELD

Various example embodiments relate to mitigation of malicious attacks in sidelink communications.

BACKGROUND

Sidelink communication refers to direct communication between user devices or user equipments without communicating via network node or base station. Sidelink communications are often used for critical public safety and law enforcement by police, army, first responders, etc., and for vehicular communication (V2X), for example. Sidelink resources may be prone to malicious attacks. Thus, solutions are needed to ensure adoption and reliable operation of sidelink communication.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided an apparatus which is a first apparatus, configured to communicate with at least one second apparatus via sidelink resources associated with unmodified sidelink control information, the apparatus comprising means for: detecting a possibility of a malicious attack on the sidelink resources or receiving an instruction to modify a sidelink control information message; transmitting, to the at least one second apparatus, a modified sidelink control information message indicative of at least one secret indication.

According to a second aspect, there is provided an apparatus which is a second apparatus, configured to communicate with a first apparatus via sidelink resources associated with unmodified sidelink control information, comprising means for: receiving, from the first apparatus, a modified sidelink control information message indicative of at least one secret indication.

According to a third aspect, there is provided a method comprising: detecting, by a first apparatus configured to communicate with at least one second apparatus via sidelink resources associated with unmodified sidelink control information, a possibility of a malicious attack on the sidelink resources or receiving an instruction to modify a sidelink control information message; transmitting, to the at least one second apparatus, a modified sidelink control information message indicative of at least one secret indication.

According to an embodiment, the at least one secret indication is indicative of a secret sidelink resource allocation, wherein the secret sidelink resources are different from the sidelink resources associated with the unmodified sidelink control information.

According to an embodiment, the method comprises selecting the secret sidelink resource allocation based on resource sensing.

According to an embodiment, the modified sidelink control information message is indicative of a configurable offset of the secret sidelink resource allocation compared to an originally indicated sidelink resources in the unmodified sidelink control information.

According to an embodiment, the configurable offset is given with respect to a time resource indicator and/or with respect to a frequency resource indicator.

According to an embodiment, the method comprises transmitting to the at least one second apparatus transmission(s) on the secret sidelink resources.

According to an embodiment, the method comprises receiving, from the at least one second apparatus, acknowledgement signalling of the reception(s) on the secret sidelink resources on feedback resources associated with the sidelink resources associated with the unmodified sidelink control information.

According to an embodiment, the secret indication is indicative of an additional resource allocation, wherein the additional resources are offset in frequency domain and a time slot of the additional resources is the same as the time slot of the sidelink resources associated with unmodified sidelink control information; and instruction to decode a sidelink control information of the additional resource allocation, wherein the sidelink control information of the additional resource allocation is indicative of a protected sidelink resource allocation, wherein the protected sidelink resources are different from the sidelink resources associated with the unmodified sidelink control information.

According to an embodiment, the method comprises transmitting, to the at least one second apparatus, transmission(s) on the protected sidelink resources announced in the sidelink control information of the additional resources.

According to an embodiment, the method comprises receiving, from the at least one second apparatus, acknowledgement signalling of the reception(s) on the protected sidelink resources on feedback resources associated with the sidelink resources associated with the unmodified sidelink control information.

According to an embodiment, the sidelink control information of the additional sidelink resources is receivable by the at least one second apparatus and other legitimate apparatuses configured to communicate via sidelink resources; and not receivable by a third apparatus configured to attack transmissions from the first apparatus to the at least one second apparatus, wherein the third apparatus is a half-duplex apparatus.

According to an embodiment, the at least one secret indication is interpretable by the first apparatus and the at least one second apparatus; and not interpretable by a third apparatus configured to attack transmissions from the first apparatus to the at least one second apparatus.

According to an embodiment, the method comprises monitoring malicious attacks on transmissions on the sidelink resources associated with the unmodified sidelink control information.

According to an embodiment, the method comprises refraining from transmitting on the sidelink resources associated with the unmodified sidelink control information.

According to an embodiment, the detecting the possibility of a malicious attack on the sidelink resources comprises:

detecting malicious transmission(s) from a third apparatus to the at least one second apparatus on the sidelink resources associated with the unmodified sidelink control information; and/or receiving, from the at least one second apparatus, indication of detection of malicious transmission(s) on the sidelink resources associated with the unmodified sidelink control information; and verifying, based on the detected malicious transmission(s) on the sidelink resources associated with the unmodified sidelink control information, presence of the third apparatus configured to attack transmissions from the first apparatus to the at least one second apparatus.

According to a fourth aspect, there is provided a method comprising: receiving, from a first apparatus by a second apparatus configured to communicate with the first apparatus via sidelink resources associated with unmodified sidelink control information, a modified sidelink control information message indicative of at least one secret indication.

According to an embodiment, the at least one secret indication is indicative of a secret sidelink resource allocation, wherein the secret sidelink resources are different from the sidelink resources associated with the unmodified sidelink control information.

According to an embodiment, the modified sidelink control information message is indicative of a configurable offset of the secret sidelink resource allocation compared to an originally indicated sidelink resources in the unmodified sidelink control information.

According to an embodiment, the configurable offset is given with respect to a time resource indicator and/or with respect to a frequency resource indicator.

According to an embodiment, the method comprises receiving, from the first apparatus, reception(s) on the secret sidelink resources.

According to an embodiment, the method comprises transmitting acknowledgement signalling of the reception(s) on the secret sidelink resource on feedback resources associated with the sidelink resources associated with the unmodified sidelink control information.

According to an embodiment, secret indication is indicative of an additional resource allocation, wherein the additional resources are offset in frequency domain and a time slot of the additional resources is the same as the time slot of the sidelink resources associated with unmodified sidelink control information; and instruction to decode a sidelink control information of the additional resource allocation, wherein the sidelink control information of the additional resource allocation is indicative of a protected sidelink resource allocation, wherein the protected sidelink resources are different from the sidelink resources associated with the unmodified sidelink control information.

According to an embodiment, the method comprises receiving, from the first apparatus, reception(s) on the protected sidelink resources announced in the sidelink control information of the additional resources.

According to an embodiment, the method comprises transmitting acknowledgement signalling of the reception(s) on the protected sidelink resources on feedback resources associated with the sidelink resources associated with the unmodified sidelink control information.

According to an embodiment, the sidelink control information of the additional sidelink resources is receivable by the at least one second apparatus and other legitimate apparatuses configured to communicate via sidelink resources; and not receivable by a third apparatus configured to attack transmissions from the first apparatus to the at least one second apparatus, wherein the third apparatus is a half-duplex apparatus.

According to an embodiment, the method comprises interpreting the modified sidelink control information message as a warning about potential attack on the sidelink resources associated with the unmodified sidelink control information.

According to an embodiment, the method comprises monitoring malicious attacks on the sidelink resources associated with the unmodified sidelink control information.

According to an embodiment, the method comprises: in response to detecting malicious transmission(s) on the sidelink resources associated with the unmodified sidelink control information, transmitting an indication of detection of the malicious transmission(s) to the first apparatus.

According to an embodiment, the at least one secret indication is interpretable by the first apparatus and the at least one second apparatus; and not interpretable by a third apparatus configured to attack transmissions from the first apparatus to the at least one second apparatus.

According to a fifth aspect, there is provided a non-transitory computer readable medium comprising program instructions that, when executed by at least one processor, cause a first apparatus to at least to perform the method according to the third aspect and any of the embodiments thereof.

According to a sixth aspect, there is provided a non-transitory computer readable medium comprising program instructions that, when executed by at least one processor, cause a second apparatus to at least to perform the method according to the fourth aspect and any of the embodiment thereof.

According to a seventh aspect, there is provided a computer program configured to cause a first apparatus to perform at least the method according to the third aspect and any of the embodiments thereof, when run on a computer.

According to an eighth aspect, there is provided a computer program configured to cause a first apparatus to perform at least the method according to the fourth aspect and any of the embodiments thereof, when run on a computer.

BRIEF DESCRIPTION OF THE DRAWINGS

FIG. 2 shows, by way of example, an illustration of a first attack type;

FIG. 4 shows, by way of example, a flowchart of a method;

FIG. 6 shows, by way of example, an information element showing the time offset;

FIG. 10 shows, by way of example, a flowchart of a method;

FIG. 12 shows, by way of example, an information element showing at least one secret indication;

DETAILED DESCRIPTION

Figure 1:
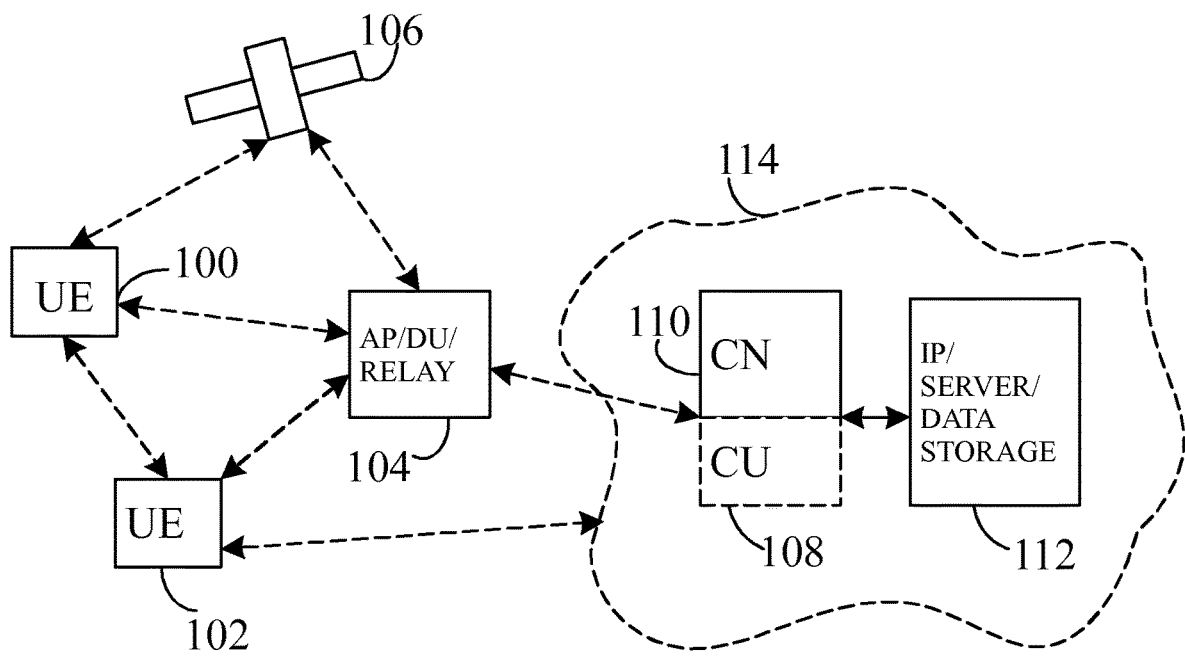
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the TAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz-cmWave, below 7 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

Intelligent transport systems (ITS) and cooperative ITS (C-ITS) refer to applications using wireless communication between vehicles, vehicle to vehicle communication (V2V), and between vehicles and smart road infrastructure, vehicle-to-smart road infrastructure communication (V2I), for increasing traffic safety and efficiency. V2V and V2I communications are collectively known as V2X communication, i.e. vehicle to everything communication, wherein X may be e.g. a vehicle, infrastructure or network. Other terms for ITS communication are e.g. Car2X i.e. car to everything, wherein X may be e.g. a car, infrastructure or network, dedicated short-range communications (DSRC), and ITS-G5 which refers to a wireless local area network (WLAN) based radio access layer in the 5 GHz band.

Sidelink communication refers to direct communication between user devices or user equipments without communicating via network node or base station. Sidelink communications are often used for critical public safety and law enforcement by police, army, first responders, etc.

Resource allocation in sidelink transmissions are considered to follow two modes, that is, mode 1 and mode 2. In mode 1, sidelink resources are scheduled by a network node, e.g. a gNB. In mode 2, the user equipment autonomously selects sidelink resources from a configured or pre-configured sidelink resource pool(s) based on a channel sensing mechanism. If the UE is in coverage area of a network node, the network may be configured to adopt mode 1 or mode 2 communication mechanism. If the UE is out of the coverage area of the network node, the mode 2 is adopted as the communication mechanism.

In mode 2, the transmitting UE selects autonomously the resources for the physical sidelink control channel (PSCCH) and the physical sidelink shared channel (PSSCH), in response to receiving traffic from other UEs. To minimize the latency of the hybrid automatic repeat request (HARQ) ACK/NACK transmissions and retransmissions, the transmitting UE may reserve resources for PSCCH and PSSCH for retransmissions. The resource selection and reselection procedures comprise two phases, that is, resource sensing and resource selection.

In the resource sensing phase, the transmitting UE tries to find out candidate resources potentially available to be utilized for sidelink transmissions. The transmitting UE tries to detect the sidelink control information (SCI) launched by other UEs. The UE may read the contents of the SCI launched by other sidelink transmitters. A candidate resource may be either occupied by other sidelink transmitters but have an acceptable interference level, or not occupied by other sidelink transmitter. The interference level may be measured as reference signal received power (RSRP), for example.

In the resource selection phase, the transmitting UE randomizes the selection of candidate resources to launch the PSCCH, PSSCH, and physical sidelink feedback channel (PSFCH) during the selection window.

The SCI may comprise a plurality of fields. It may be enough for the transmitting UE to know which resources are occupied by other UEs. The UE might not need to transmit all the fields of SCI in a single stage. The fields of SCI may be transmitted in two stages. The first stage SCI may be transmitted by the PSCCH, and the first stage SCI carries information regarding the PSSCH resources and information for decoding the second stage SCI. For example, the first stage SCI comprises the resource reservation or allocation for up to three sidelink transmission opportunities. The reservation or allocation information may comprise, for example, frequency granularity in subchannels and time granularity in slots.

The second stage SCI may be multiplexed with the PSSCH, and the second stage SCI carries the remaining scheduling information for the PSSCH decoding by the target UE.

Let us consider potential malicious attacks in sidelink. More specifically, let us consider intelligent attacks, wherein an attacker does not jam the entire sidelink spectrum with excessive transmit power, the presence of which would be easily detectable by spectrum monitoring. Intelligent attackers aim to remain undetected, and cause intentional collisions on specific sidelink resources carrying attacked communications. Resource selectivity and low power of intelligent attacks make it very difficult to detect such intelligent sidelink attacks.

Figure 2:
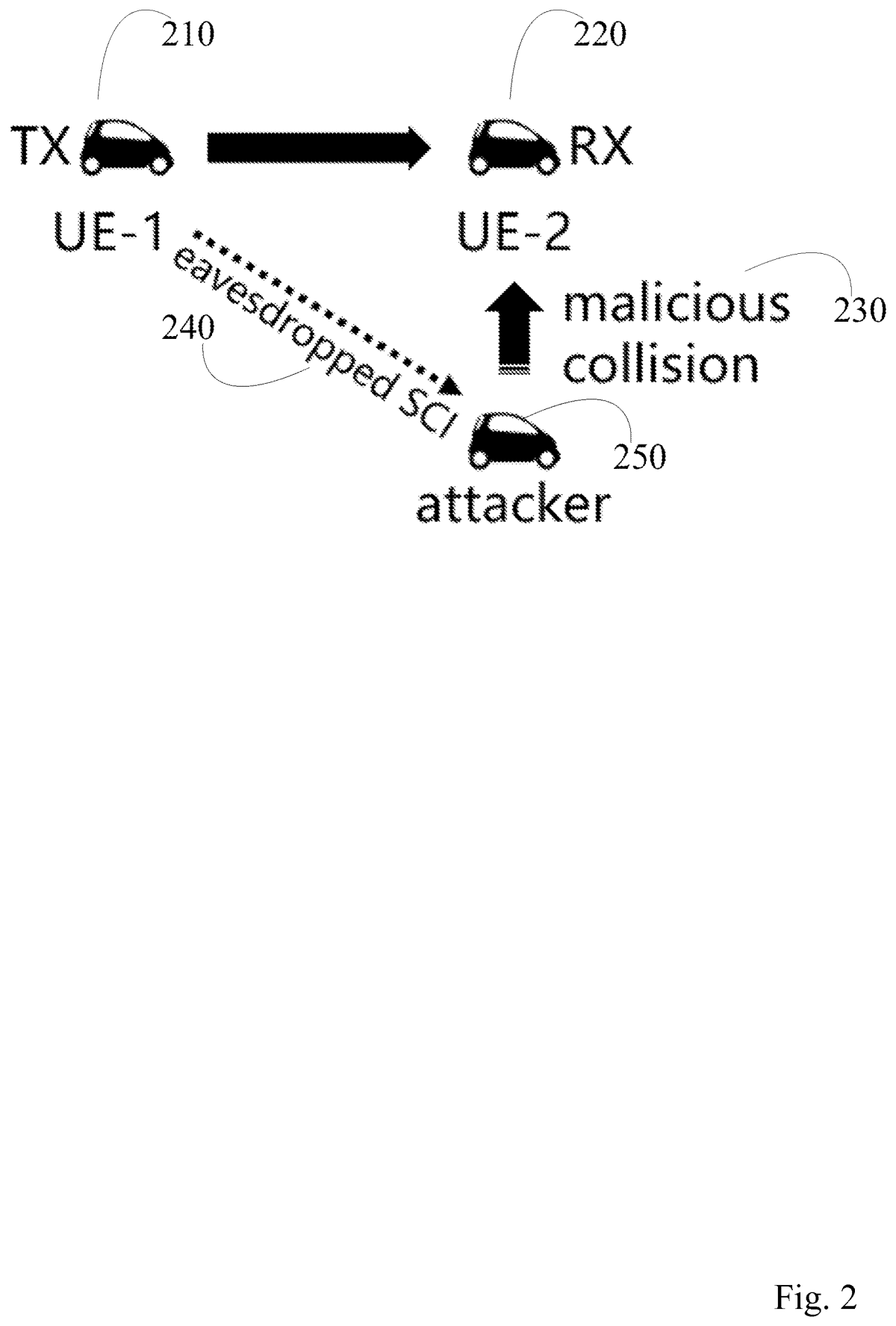

Two attack types have been identified. FIG. 2 shows, by way of example, an illustration of a first attack type. In the first attack type, an attacker 250, which is an intelligent attacker, may monitor SCI from a first device 210 (TX-UE) and intentionally transmit 230 data to collide at a second device 220 (RX-UE) on those sidelink resources indicated in the first stage SCI by the first device 210 (TX-UE). For example, the attacker may transmit data only on those sidelink resources which are indicated in the first stage SCI.

The first attack type is relatively simple and is possible if a third device 250, that is the attacker UE, is able to receive/decode 240 the SCI from a first device 210 (TX-UE). The first stage SCI is not protected and not encrypted, and is therefore decodable by any receiver. The receiver does not need to be necessarily a UE. For the first attack type there are two sub-categories, 1A and 1B.

In 1A attack, the attacker 250 eavesdrops 240 the first stage SCI followed by an attack, i.e. malicious collision 230, on the indicated sidelink resources in the 1st stage SCI. The attacker 250 does not know the identity (ID) of the second device 220 (RX-UE victim). In other words, the attacker 250 does not know which particular UE is attacked.

In 1B attack, the attacker 250 eavesdrops 240 both the 1st stage and 2nd stage SCI followed by an attack, i.e. malicious collision 230, on a known or selected victim. The second device 220, i.e. the victim, is selected by the attacker 250 by decoding the 2nd stage SCI. The attack is performed by colliding 230 with a second UE 220 on the indicated sidelink resources in the 1st stage SCI.

Figure 3:
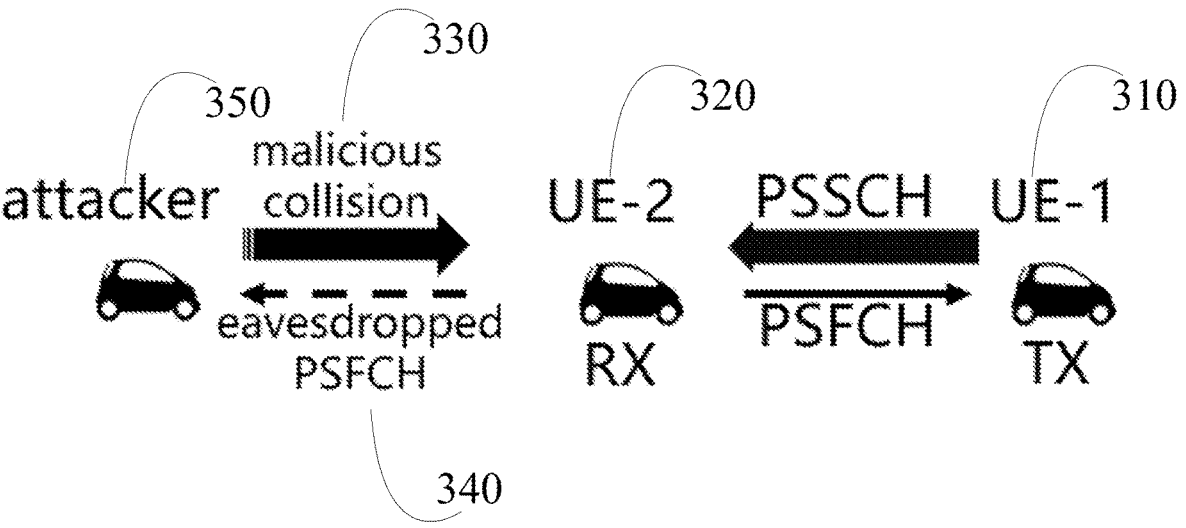
FIG. 3 shows, by way of example, an illustration of a second attack type.

FIG. 3 shows, by way of example, an illustration of a second attack type. An attacker 250 may eavesdrop 340 PSFCH feedback from a second UE 320 (RX-UE) intended as HARQ feedback to a first UE 310 (TX-UE). In case HARQ feedback is enabled, the PSFCH resources associated with a particular PSSCH have a fixed mapping. A sidelink TX UE, e.g. the first UE 310, that wants to determine optimal sidelink resources for its transmission to a peer RX UE, e.g. the second UE 320, uses the information derived from monitoring other sidelink UE's PSFCH transmission(s) in order to predict future sidelink resource allocation in case of periodic/semi-persistent scheduling. Since there is a mapping between PSSCH resources and associated feedback resources, a UE that monitors PSFCH transmission(s) of surrounding UE(s), does know the associated PSSCH resources in the past. For periodic/semi-persistent sidelink data traffic pattern, the UE may infer about future PSSCH allocation from the observation of PSFCH resources.

The attacker 350 may infer from the monitored PSFCH resources on future sidelink resource allocation used for sidelink transmission from a first UE 310 (TX-UE) to a second UE 320 (RX-UE), that the attacker may intentionally attack. The second attack type is suited for a scenario, where the first UE 310 (TX-UE) represents a hidden node for the third UE 350 (attacker) and hence the third UE 350 (attacker) cannot receive/decode the SCI sent by a first UE 310. However, a second UE 320 (RX-UE) may be close to the third UE 350 (attacker), so that the third UE 350 (attacker) is able to eavesdrop 340 the PSFCH sent by the second UE 320 intended for a first UE 310 (TX-UE).

The attacker 350, which is an intelligent attacker, may then intentionally transmit 330 data to collide at a second device 320 (RX-UE) on the future sidelink resources determined based on the eavesdropped PSFCH. For example, the attacker may transmit data only on the future sidelink resources determined based on the eavesdropped PSFCH.

There is provided an apparatus and a method for mitigating intelligent attacks on sidelink transmission(s).

FIG. 4 shows, by way of example, a flowchart of a method. The method may be performed by an apparatus, e.g. the first device or the first UE or the transmitting device or UE (TX-UE), configured to communicate via sidelink communication, or by a control device configured to control the functioning thereof when installed therein. The method 400 comprises detecting 410, by a first apparatus configured to communicate with at least one second apparatus via sidelink resources associated with unmodified sidelink control information, a possibility of a malicious attack on the sidelink resources or receiving an instruction to modify a sidelink control information message. The method 400 comprises transmitting 420, to the at least one second apparatus, a modified sidelink control information message indicative of at least one secret indication.

Upon reception of the modified sidelink control information, the second UE is aware that something may be wrong with the sidelink resources associated with the unmodified sidelink control information. Then, the second UE may decide not to receive on those originally announced resources, and may monitor those instead to detect possible attacks.

An apparatus, e.g. the first device, i.e. the transmitting UE, may modify the SCI when suspecting an attack. The UE may detect a possibility of a malicious attack on sidelink e.g. after a certain number of NACKs from the second device, i.e. the receiving UE, although radio parameters like RSRP and/or channel status information (CSI) is/are in good level. For example, the first UE may define a configurable threshold for NACKs. The threshold may be e.g. a configurable number of consecutive NACKs from the second device or the second UE or the receiving device or UE (RX-UE). When the threshold is achieved or passed, the first UE suspects an attack and may modify the SCI.

Alternatively, the first UE may receive instruction to modify the SCI. For example, it may be decided by higher layers that the SCI is to be modified. For example, in some scenario dependent police operation, it may be decided that the SCI is to be modified.

The modified SCI is indicative of a secret indication or a concealed indication. For example, the secret indication may be indicative of a secret sidelink resource allocation. There may be an agreement among a privy set or closed set of a first UE and at least one second UE on a secret modification of the SCI. Thus, only the privy set of UEs know and are able to interpret the secret indication in the modified SCI, e.g. indication of the secret sidelink resource allocation. This secret modification of the SCI is known to the first UE (TX-UE) and the second UE (RX-UE) or a set of second UEs (RX-UEs), but the secret modification is not known to a third device i.e. the attacker. For example, the first UE and the second UE or a set of second UEs may belong to a public safety authority such as a police or national security that aim to at least temporarily secure the sidelink communication. The third UE i.e. the attacker is outside of the privy set and is not aware of the secret SCI modification nor of the intention of the SCI modification.

The secret sidelink resource allocation, or secret PSSCH, may be selected by the first UE based on resource sensing. The secret resources are deemed as free and available such that unintentional collisions by other UEs are avoided. The first UE may ensure based on the resource sensing that the secret resources are a subset of free candidate sidelink resources which are not yet announced or reserved by other UEs.

The secret sidelink resources differ from the originally indicated sidelink resources in the unmodified SCI by a configurable offset. The original sidelink radio resources corresponding to the unmodified SCI and unmodified PSFCH may be referred to as garbage PSSCH. The offset sidelink resources corresponding to the modified SCI and modified PSFCH may be referred to as the secret PSSCH.

The modified SCI message comprising a secret indication may be indicative of a secret sidelink resource allocation and may, for example, comprise an indication that informs the second device or the second UE or a set of second devices about the configurable offset of the secret sidelink resources compared to the originally indicated sidelink resources.

Figure 5A:
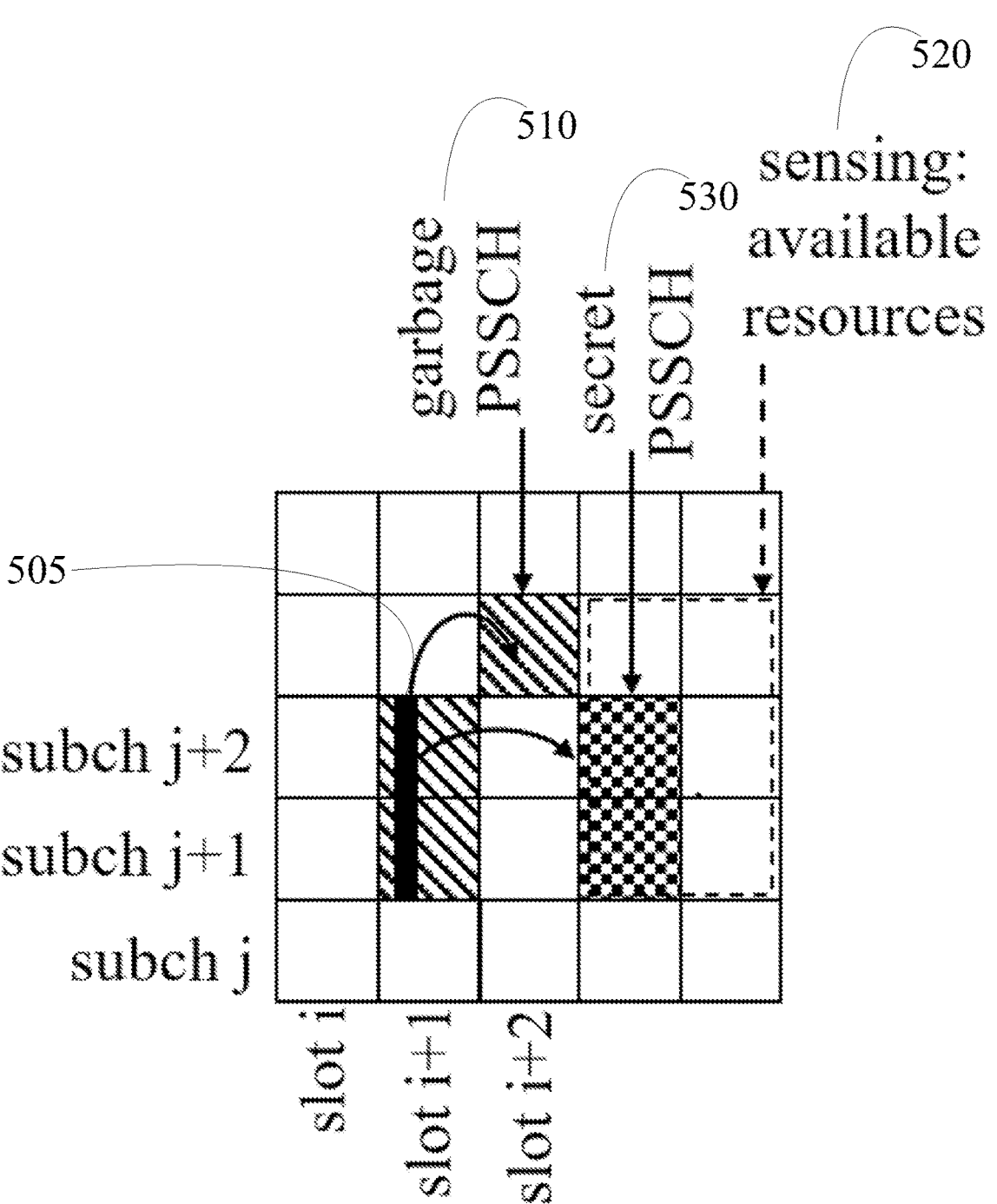
FIG. 5a shows, by way of example, illustration of garbage resources and secret resources.

FIG. 5a shows, by way of example, illustration of garbage resources and secret resources. The original sidelink resources corresponding to unmodified SCI are referred to as garbage resources or garbage PSSCH 510. Available resources 520 may be determined by resource sensing. From the available resources, secret sidelink resource allocation may be selected, and the secret sidelink resource allocation may be indicated in the modified SCI 505. The secret sidelink resource is referred to as secret PSSCH 530. In the example of FIG. 5, the offset of the secret resources compared to the originally indicated resources is 2 slots.

Referring to FIG. 2 illustrating an example of a malicious attack, the attacker 250 may cause the following: The attacker may eavesdrop the unmodified SCI, or the modified SCI, but cannot interpret the secret indication or secret offset in the modified SCI. The attacker is able to decode the unmodified SCI, or original SCI. Then, the attacker may intentionally transmit malicious collisions to the second device or the second UE or a set of second devices on the sidelink resources indicated in the unmodified SCI, that is, on the garbage PSSCH.

Referring to FIG. 3 illustrating an example of a malicious attack, the attacker 350 may cause the following: The attacker (third UE) may eavesdrop PSFCH feedback sent by a second UE (RX-UE) in case the first UE (TX-UE) is a hidden node to the third UE. The attacker may infer from the eavesdropped PSFCH resources, which are associated with the garbage PSSCH, future resource allocations, e.g. periodic resource allocations. The attacker may send malicious collisions to a second UE (RX-UE) on the deduced/expected future sidelink resources (garbage PSSCH) derived from the eavesdropped PSFCH resources.

The method as disclosed herein enables mitigation of attacks on sidelink resources, e.g. of intelligent attacks illustrated in FIG. 2 and FIG. 3.

Figure 5B:
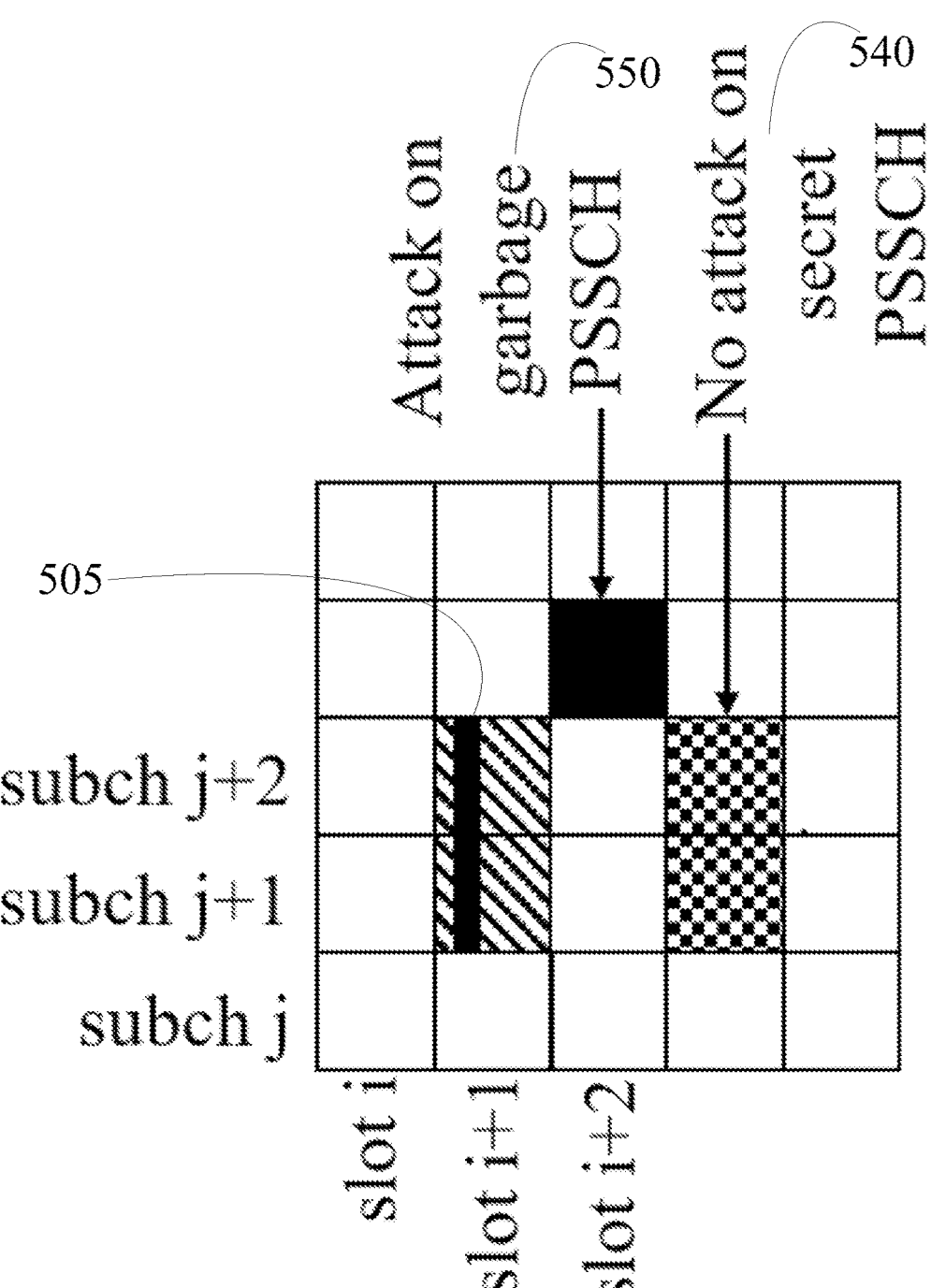
FIG. 5b shows, by way of example, illustration of garbage resources and secret resources.

FIG. 5b shows, by way of example, illustration of garbage resources and secret resources. Since the attacker cannot interpret the modified SCI 505, the attacker may attack the garbage resources 550, which are associated with the resources in the unmodified SCI, without causing harm to the secret resources 540.

As an example, the first UE may modify the SCI by using the information element (IE) sl-NumReservedBits in the SCI format-1A (first stage SCI) as defined in TS38.212. The first UE may use 2, 3 or 4 bits in sl-NumReservedBits in SCI format-1A to indicate the secret offset with respect to the time resource assignment or time resource indicator TRIV and/or the frequency resource assignment or frequency resource indicator FRIV indicated in the first stage SCI.

The secret indication in the modified SCI, which is interpretable by the first UE and the second UE or set of second UEs but not by the attacker, may indicate, for example, a linear time offset i.e. number of offset slots with respect to the TRIV. For example, only a privy set of UEs comprising the first UE and at least one second UE is able to interpret the secret indications in the modified SCI. FIG. 6 shows, by way of example, an information element 600 showing the time offset 610.

Figure 7:
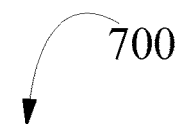
FIG. 7 shows, by way of example, an information element showing the frequency offset.
Figure 8:
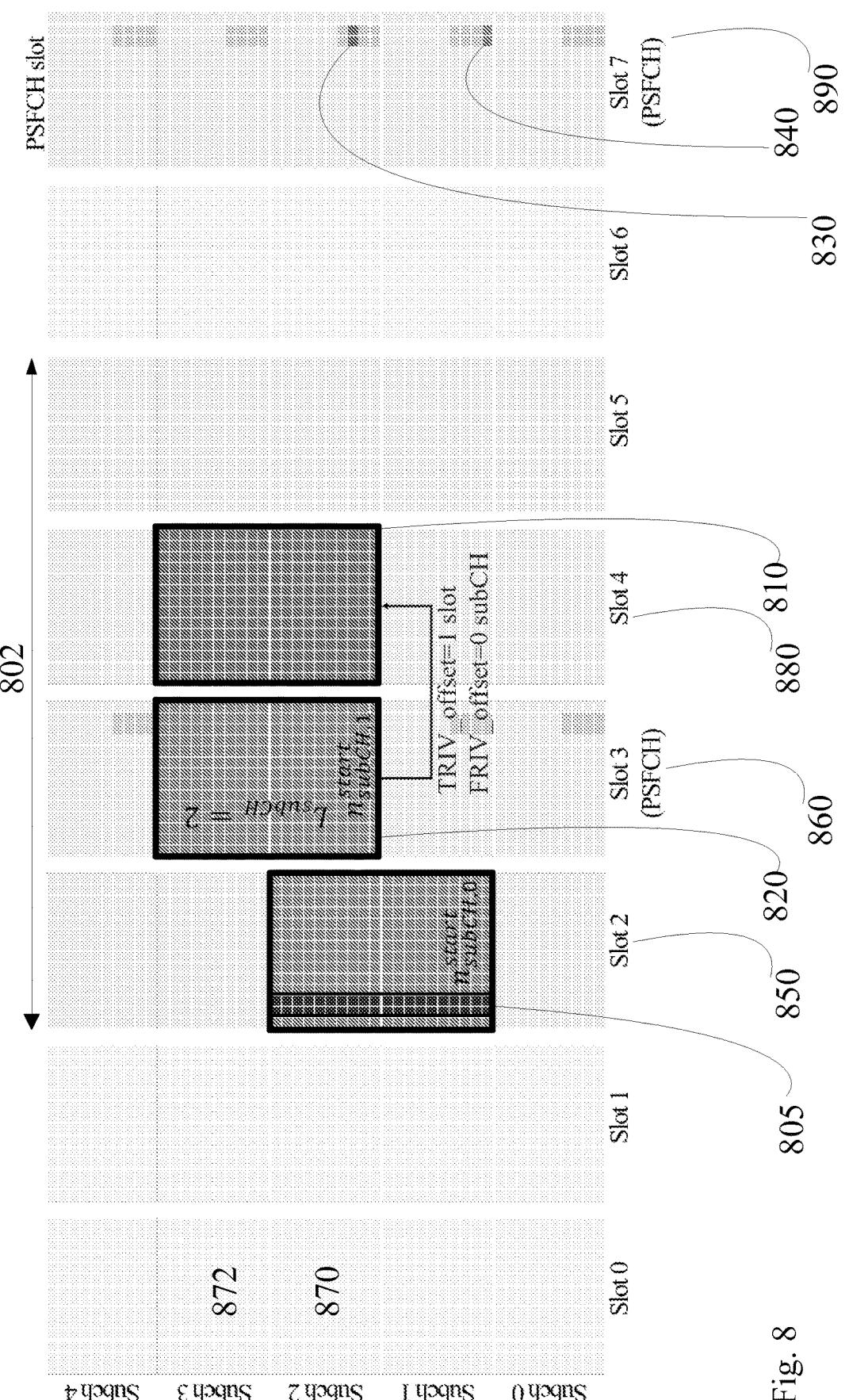
FIG. 8 shows, by way of example, illustration of garbage resources and secret resources.

FIG. 7 shows, by way of example, an information element 700 showing the frequency offset 710. For example, only a privy set of UEs comprising the first UE and at least one second UE is able to interpret the secret indications in the modified SCI. The SCI may indicate future resource allocations, e.g. up to three different future resource allocations, that is, the first, second and third sidelink resource or resource set. The secret indication in the modified SCI, which is interpretable by the first UE and at least one second UE but not by the attacker, may indicate one or more of:

a linear frequency offset i.e. number of offset subchannels with respect to the starting subchannel index in the second resource, $n_{subCH,1}^{start}$ (e.g. the starting subchannel of the garbage resources 820 in the example of FIG. 8)

a linear frequency offset i.e. number of offset subchannels with respect to the starting subchannel index in the third resource, $n_{subCH,2}^{start}$ a linear frequency offset i.e. number of offset subchannels with respect to the highest subchannel in the second resource $n_{subCH,1}^{start}+L_{subCH}$, wherein the $L_{subCH}$ is the number of the contiguous subchannels occupied by the resources (e.g. $L_{subCH}$ of the garbage resources 820 in the example of FIG. 8 is 2)

a linear frequency offset i.e. number of offset subchannels with respect to the starting subchannel in the third resource $n_{subCH,2}^{start}+L_{subCH}$ For example, the modified SCI may indicate a combination of offsets in time and frequency domain for one or more resource reservations, for example, for the first, second, and third resource reservations.

As another example, the secret indication in the modified SCI, which is interpretable by the first UE and the second UE(s) but not by the attacker, may indicate a predefined bitmap. The bitmap may indicate the offset in time and frequency domain for the sidelink resources. For example, only a privy set of UEs comprising the first UE and at least one second UE is able to interpret the secret indications in the modified SCI.

As another example, the secret indication in the modified SCI, which is interpretable by the first UE and the second UE(s) but not by the attacker, may be an indication to pointing to another indication in the second stage SCI. For example, only a privy set of UEs comprising the first UE and at least one second UE is able to interpret the secret indications in the modified SCI.

FIG. 8 shows, by way of example, illustration of garbage resources and secret resources. Slots 2 to 5 represent the bundling window 802 and are associated with PSFCH in the slot 7 890. In the example of FIG. 8, the secret resource 810 is offset by one timeslot with respect to the original resource, i.e. the garbage resource 820. The subchannel offset is zero with respect to the starting subchannel of the original resource, i.e. the garbage resource, indicated in the unmodified SCI. In other words, TRIV offset is 1 slot and the FRIV offset is 0 in the example of FIG. 8. The offsets may be secretly indicated in the modified SCI 805.

Resource blocks 830 depict the PSFCH resources associated with the secret PSSCH, and the resource blocks 840 depict the PSFCH resources associated with the garbage PSSCH.

In an example, the first device (TX-UE) deviates from the normal TX-UE behavior and instead of transmitting will monitor those sidelink resources indicated in the unmodified SCI, that is, monitor the garbage resources 820. In the example of FIG. 8, the first device (TX-UE) announces in slot 2 850 a second transmission reservation in slot 3 860. However, the first UE will not transmit in slot 3 860 but rather monitor slot 3 subchannels 2 and 3 870, 872 to verify whether a third UE, i.e. an attacker, is intentionally transmitting or colliding on the garbage resources, i.e. garbage PSSCH 820.

Although the attacker may have sent a sidelink transmission on the eavesdropped sidelink resources the attacker has failed its target as the secret sidelink transmission has occurred unnoticed by the attacker in slot 4 880. Thus, the attack has not caused any harm.

The second UE or a set of second UEs is aware about the protected sidelink transmission via secret resources 810, by the indication in the modified SCI. Thus, the second UE attempts to decode the secret PSSCH on the offset sidelink resources indicated in the modified SCI. The second UE or a set of second UEs is part of the privy set of UEs that can interpret the secret indications in the modified SCI.

The second UE (RX-UE) or a set of second UEs may provide acknowledgement signalling, e.g. the HARQ feedback, of the secret PSSCH on feedback resources, e.g. PSFCH resources 840, that are associated with the garbage PSSCH. This will prevent a third UE, i.e. the attacker, that may be a hidden node for the first device, from inferring on future PSSCH resources by eavesdropping the PSFCH sent by the second device (RX-UE) or a set of second devices.

Figure 9:
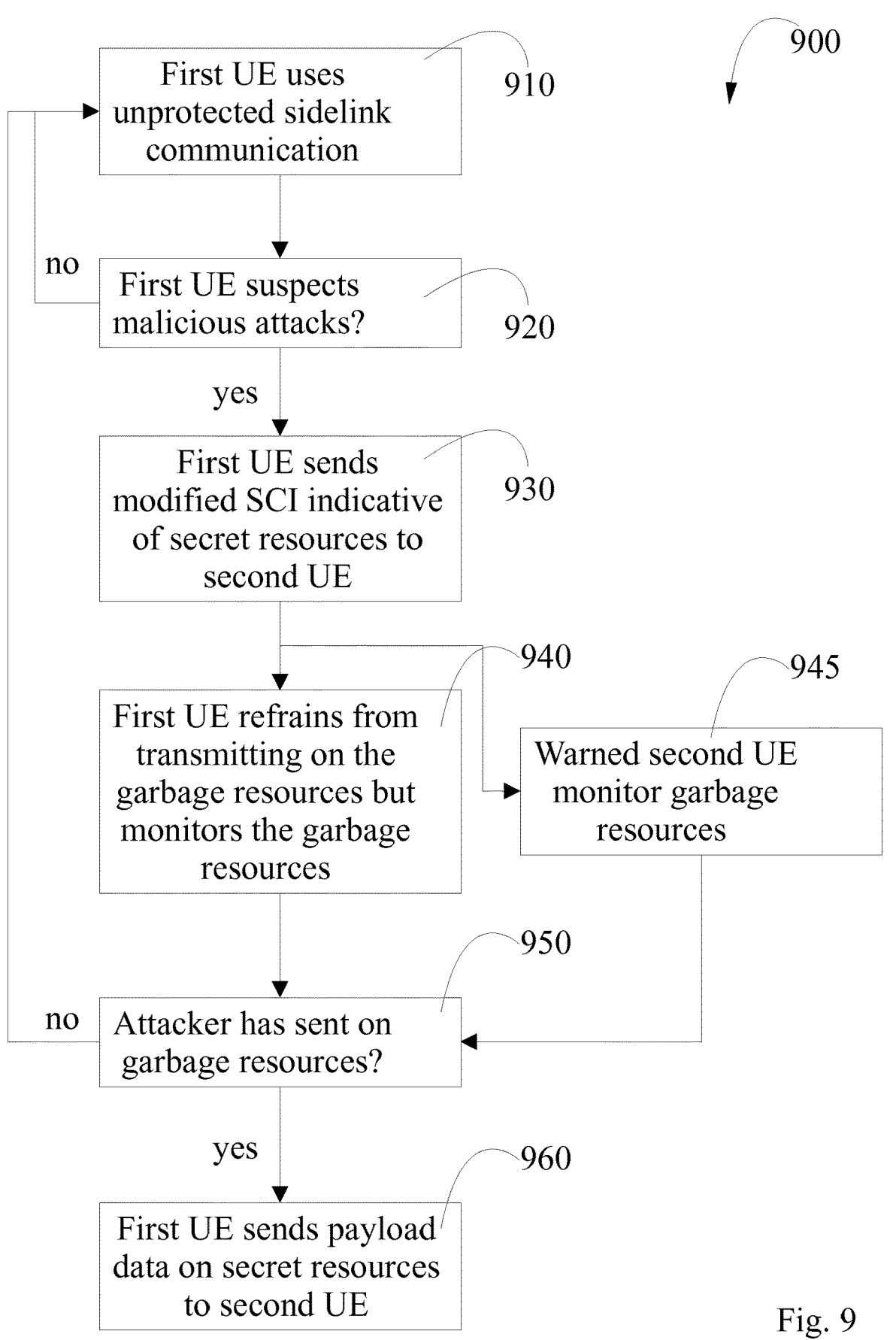
FIG. 9 shows, by way of example, a flowchart of a method.

FIG. 9 shows, by way of example, a flowchart of a method 900 performed by an apparatus which is the first UE. The first UE is configured 910 to communicate with at least one second apparatus or second UEs via unprotected sidelink resources. The unprotected sidelink resources are associated with unmodified sidelink control information, that is, the original SCI. In at least some embodiments, the first UE and the at least one second UE are half-duplex apparatuses. A half-duplex apparatus cannot receive and transmit at the same time.

The first UE may suspect 920 malicious attacks. For example, the first UE may detect a possibility of a malicious attack on the sidelink resources e.g. based on observations of inconsistent channel conditions versus number of consecutive NACKs received from the second UE. For example, even though the channel conditions are good, there may be a high number of NACKs, which may indicate an attack. Alternatively, it may be decided by higher layers that the UE will modify the SCI in order to protect against possible attacks.

The first UE transmits 930 a modified SCI to the second UE. The modified SCI, or a spoof SCI, is indicative of at least one secret indication e.g. of a secret sidelink resource allocation.

The first UE changes secretly its behavior. The first UE may refrain 940 from transmitting on the garbage resources, i.e. the sidelink resources associated with the unmodified SCI. The first UE may monitor 940 transmissions on the garbage resources in order to detect attacks and verify the presence of a third UE, i.e. the attacker, that will send malicious collisions on the sidelink resources indicated in the unmodified SCI. Verification of the presence of the attacker is based on detecting the attacker transmitting on the sidelink resources that have been originally reserved by the first UE.

The second UE or a set of second UEs may be warned by the reception of the modified SCI. The modified SCI will appear as a normal SCI to the attacker. The first UE may warn the second UE or a set of second UEs about potential attacks on the sidelink resources associated with the unmodified SCI. The second UE may then monitor 945 these garbage PSSCH resources to verify whether the attacker is sending malicious collisions on the sidelink resources indicated in the unmodified SCI. Since the second UE has been warned about potential attacks on the sidelink resources indicated in the unmodified SCI, the second UE is aware that the first UE will not transmit on those sidelink resources, that is, on the garbage resources. If the second UE detects any transmission on those garbage resources originally reserved by the first UE, it knows that those transmissions are malicious collisions caused by the attacker.

If it is detected 950 that the attacker, or the third UE, has sent transmissions on the garbage resources, the first UE may send 960 payload data on the secret resources to the second UE or a set of second UEs. In at least some embodiments, the first UE may use the secret resources for transmissions to the second UE even without detecting the attacker sending on the garbage resources.

The warned second UE(s) may, based on the secret indication in the modified SCI, attempt to decode the secret resources which are offset by the indication in the modified SCI. The second UE may provide a modified HARQ feedback on PSFCH resources associated with the PSSCH resources in the unmodified SCI. Instead of using PSFCH resources that are associated with or mapped to the secret resources, the second UE provides the HARQ feedback via PSFCH resources associated with the resources indicated in the unmodified SCI. This prevents the attacker from inferring the secret resources if the attacker monitors the PSFCH transmissions of the second UE.

Figure 10:
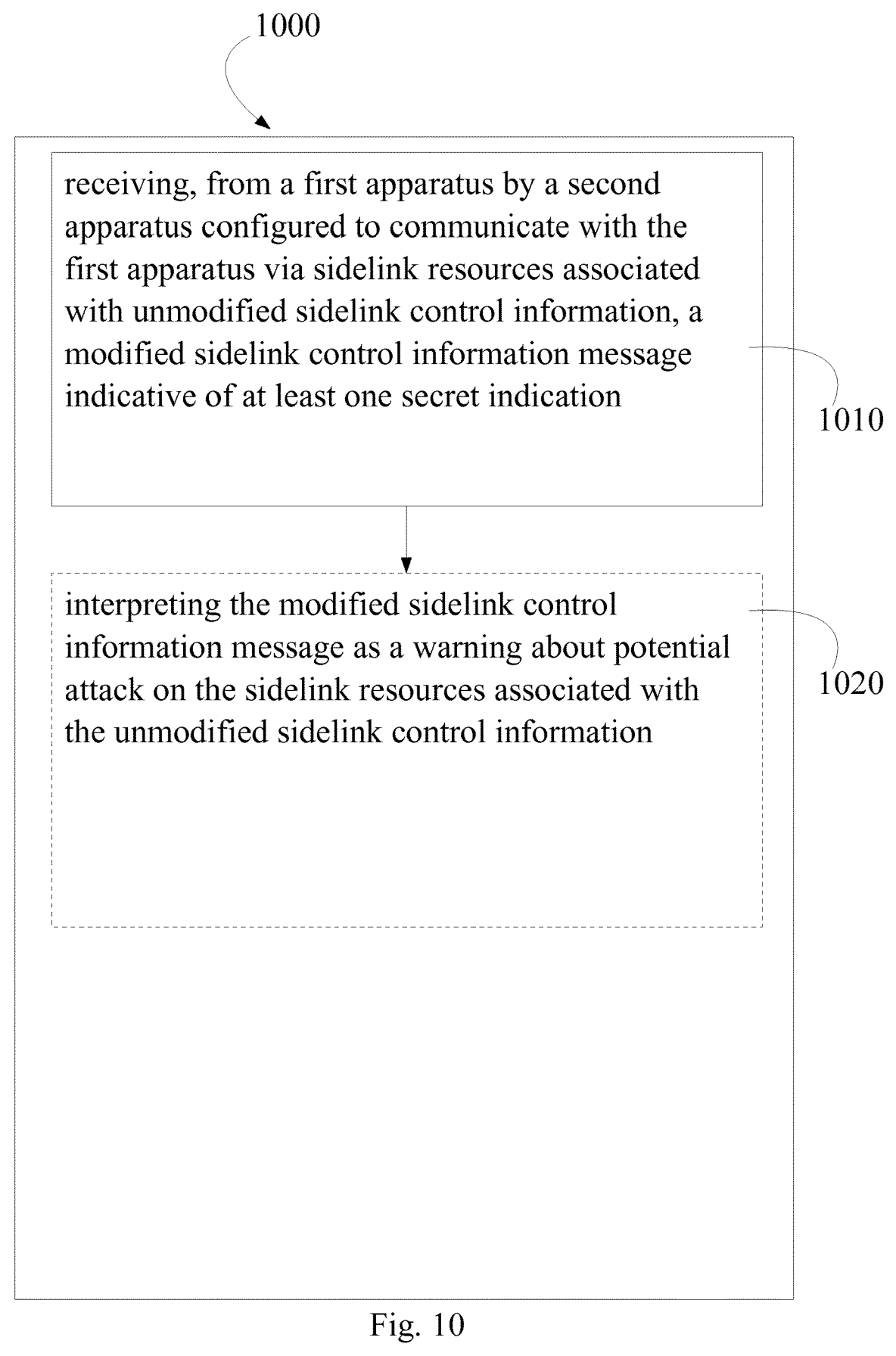

FIG. 10 shows, by way of example, a flowchart of a method. The method may be performed by an apparatus, e.g. the second UE or the receiving UE (RX-UE), configured to communicate via sidelink communication, or by a control device configured to control the functioning thereof when installed therein. The method 1000 comprises receiving 1010, from a first apparatus by a second apparatus configured to communicate with the first apparatus via sidelink resources associated with unmodified sidelink control information, a modified sidelink control information message indicative of at least one secret indication. The method 1000 may comprise interpreting 1020 the modified sidelink control information message as a warning about potential attack on the sidelink resources associated with the unmodified sidelink control information.

Although the first device or UE (TX-UE) performs sensing to allocate the secret resources on available sidelink resources, a fourth device may unintentionally collide with the secret resources. Let us consider that the fourth device is a legitimate UE configured to communicate via sidelink resources. The fourth device is not an attacker. The fourth device might not be part of the privy set of the UEs that is able to interpret the modified SCI. Since the fourth device cannot interpret the modified SCI, the fourth device may unintentionally transmit on the secret resources.

In the following, the modified SCI is indicative of at least one secret indication. The at least one secret indication may be indicative of additional resource allocation, wherein the additional resources are offset in frequency domain and the time slot of the additional resources is the same as the time slot of the sidelink resources associated with the unmodified SCI. In addition, the secret indication is indicative of instruction or request for the second UE to decode the SCI of the additional resource allocation. The SCI is indicative of protected sidelink resource allocation, wherein the protected sidelink resources are different from the sidelink resources associated with the unmodified SCI.

The attacker, i.e. the third apparatus, is considered to be a half-duplex apparatus. A half-duplex apparatus cannot receive and transmit at the same time. Thus, the attacker is not able to detect transmissions on the additional resources, since the attacker is simultaneously attacking on the garbage resources associated with the unmodified SCI.

The fourth devices, e.g. other legitimate sidelink UEs, perform sensing for finding available resources, and are able to decode the SCI of the additional resource allocation.

Thus, the fourth devices are aware of the reservation of the protected sidelink resource allocation and unintentional collisions by the fourth devices on the protected resources are avoided.

The first UE may detect malicious transmission(s) from a third UE, i.e. the attacker, to the at least one second UE on the sidelink resources associated with the unmodified SCI. Alternatively or additionally, the first UE may receive, from the at least one second UE, report indicating detection of a malicious transmission from the attacker to the at least one second UE. As a further example, the first UE may receive instruction from higher layers to modify SCI as a precaution.

Then, the first UE may transmit to the at least one second UE a modified SCI indicative of secret indication(s), which is indicative of an additional resource allocation.

Figure 11A:
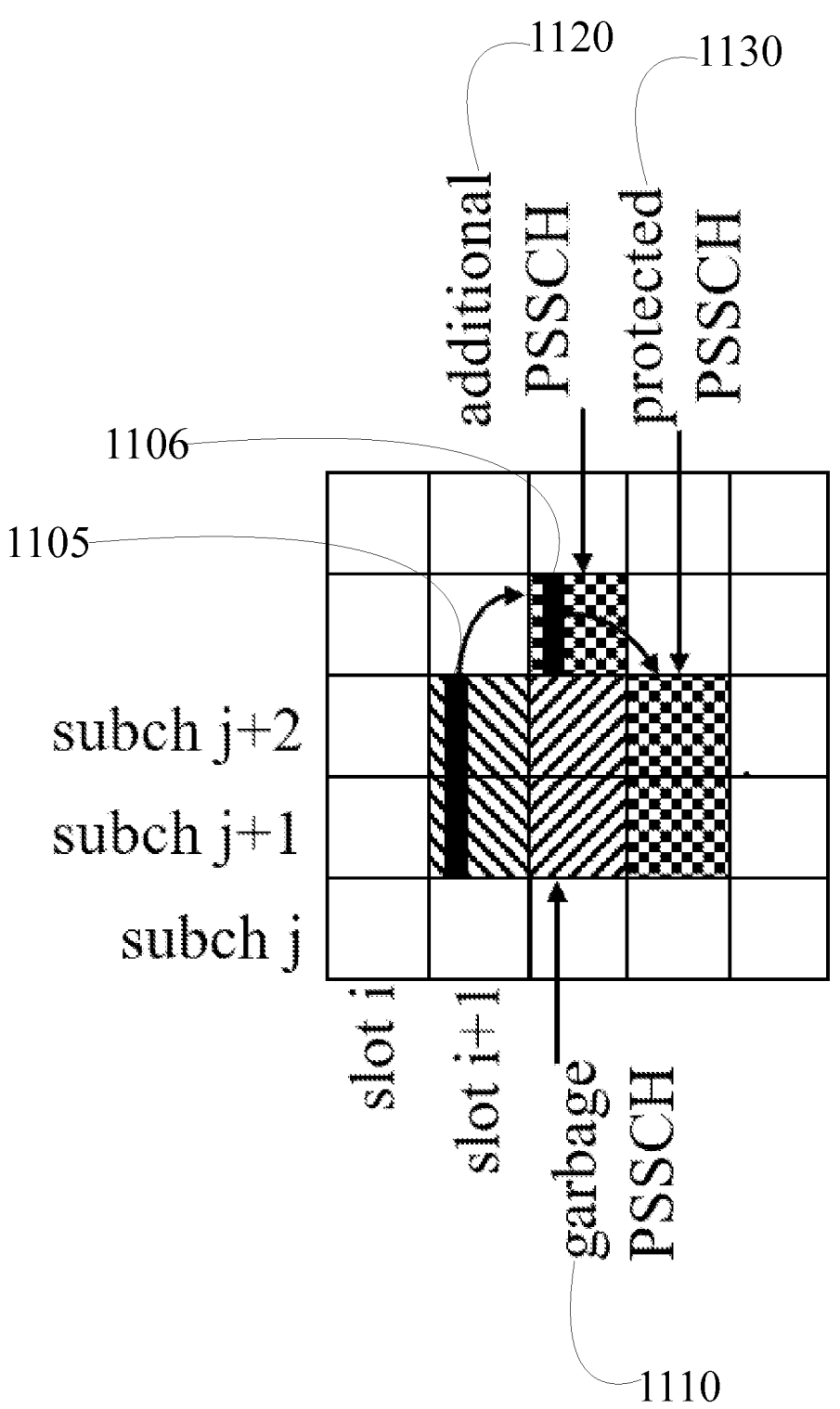
FIG. 11*a* shows, by way of example, illustration of garbage resources, additional resources and protected resources.

FIG. 11a shows, by way of example, illustration of garbage resources, additional resources and protected resources. The original sidelink resources corresponding to unmodified SCI are referred to as garbage resources or garbage PSSCH 1110. A modified SCI 1105 may be indicative of the additional resources 1120. The additional resources 1120 are offset in frequency domain, when compared to the garbage resources 1110. Subchannel of the additional resources 1120 is a contiguous subchannel with respect to the garbage resources 1110. A time slot of the additional resources 1120 is the same as the time slot of the garbage resources 1110.

The protected resources 1130 are announced in the sidelink control information 1106 of the additional resources 1120. The surrounding sidelink UEs, which are the fourth devices, may perform sensing. Thus, the SCI 1106 of the additional resources 1120 is receivable by the devices surrounding the first UE, that is, receivable by all other devices configured to communicate via sidelink resources, but not receivable by the half-duplex attacker which is attacking the garbage resources (see FIG. 11b). During the attack, the attacker cannot receive any sidelink communication.

Figure 11B:
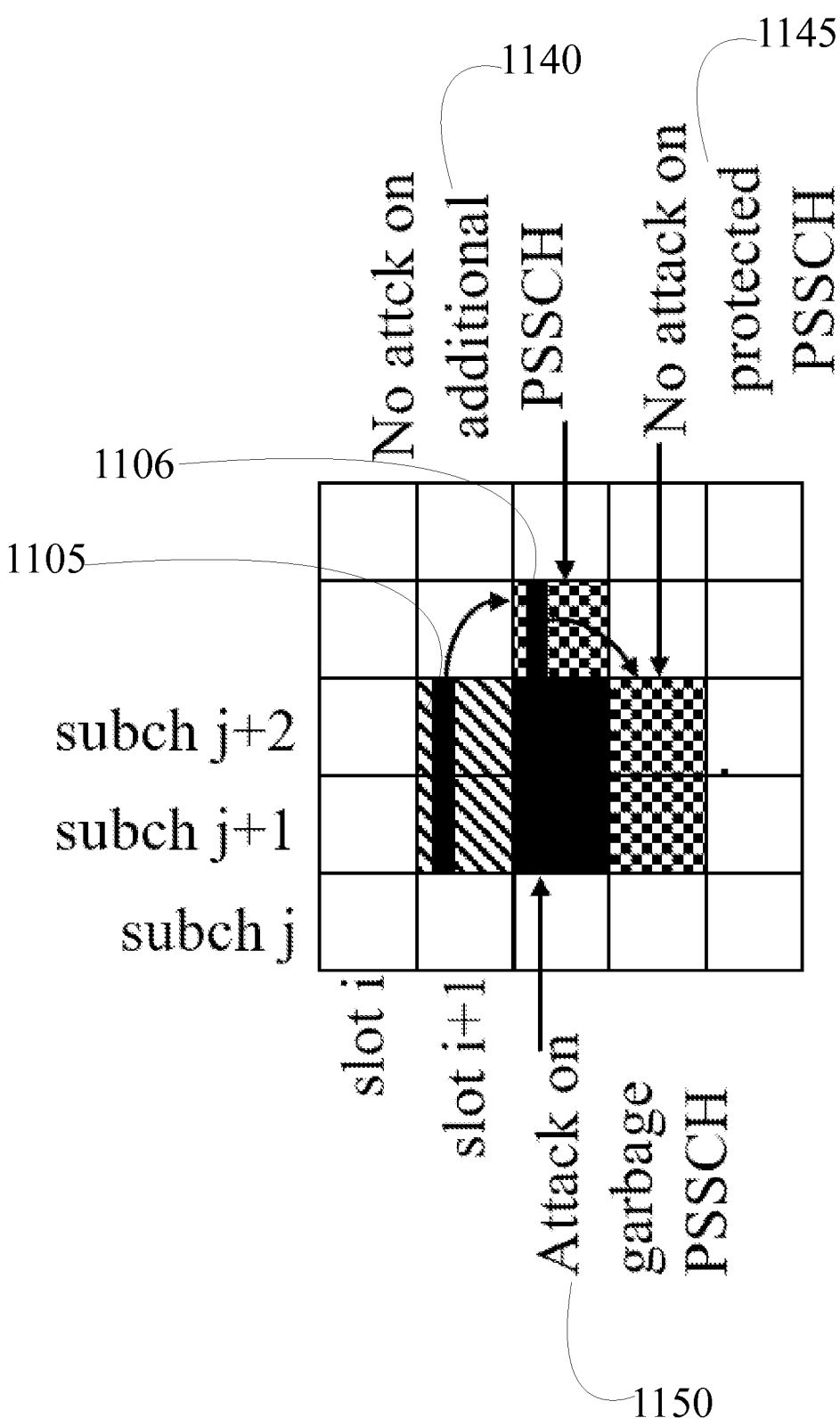
FIG. 11*b* shows, by way of example, illustration of garbage resources, additional resources and protected resources.

FIG. 11b shows, by way of example, illustration of garbage resources, additional resources and protected resources. Since the attacker cannot interpret the modified SCI 1105, the attacker may attack the garbage resources 1150, which are associated with the resources in the unmodified SCI, without causing harm to the additional resources 1140 and the protected resources 1145. The attacker is not aware of the announcement of the protected resources in the SCI 1106 of the additional resources because the attacker is a half-duplex apparatus. When the attacker is attacking the garbage resources 1150, the attacker cannot receive any sidelink communication simultaneously.

The surrounding devices configured to communicate via sidelink resources are aware of the reserved additional resources and the protected resource reservation announced in the SCI 1106 of the additional resources 1120. Thus, the unintentional collisions by the surrounding devices (fourth devices) are prevented.

The first UE may use the protected resources 1130 for the sidelink data payload transmission to the at least one second UE without fearing attacks from the attacker.

As in an example above, the first UE may modify the SCI by using the IE sl-NumReservedBits in the SCI format-1A (first stage SCI) as defined in TS38.212. For example, a set of secret indications may be announced within the IE 1200 as shown in FIG. 12. Column 1210 shows examples of secret indications. The privy set of the first UE and the second UE(s) is able to interpret the secret indications. For example, only the privy set of the first UE and the second UE(s) is able to interpret the secret indications.

The first indication in the modified SCI may secretly inform the second UE that the first UE will monitor the garbage resources, that is, the resources indicated in the unmodified SCI. This indication is like a warning to the second UE that sidelink attacks are expected on the sidelink resources originally reserved for transmissions from the first UE to the second UE. The first UE refrains from transmitting on these garbage resources, but may receive on the garbage resources in order to detect malicious transmissions by the attacker on the resources reserved in the unmodified SCI.

The second indication in the modified SCI may request the second UE to monitor the sidelink resources indicated in the unmodified SCI, that is, the garbage resources, and report to the first UE if an attacker has sent malicious transmissions on the garbage resources. The second UE may use the feedback resources, e.g. PSFCH resources, associated with the garbage resources for reporting. For example, ACK may indicate that attack is detected and NACK may indicate that no attack is detected, or vice versa.

The third indication in the modified SCI may secretly inform the second UE about the additional sidelink resources on an offset subchannel, which is a contiguous subchannel in the same time slot with respect to the garbage resources. The third indication may also request the second UE(s) to decode the SCI of the additional resources on a subchannel beginning at $n_{subCH,1}^{start}+L_{subCH}+1$, i.e. the contiguous subchannel on top of the subchannel with the highest index for the second resource (garbage resources), and the same time slot t used for the garbage resources. Before reservation of the additional resources, the first UE may apply sensing to verify that the contiguous subchannel on top of the garbage resources is not yet reserved for another sidelink transmission.

The fourth indication in the modified SCI may secretly inform the second UE(s) that there are no available sidelink resources or sidelink subchannels, that could be used for transmissions that should be protected, on a contiguous subchannel in the same time slot with respect to the garbage resources. The fourth indication may be used in highly congested scenarios, where the first UE is unable to find any contiguous subchannels in the same time slot as the garbage resources that could carry the PSSCH payload to be transmitted on the protected resources.

Figure 13A:
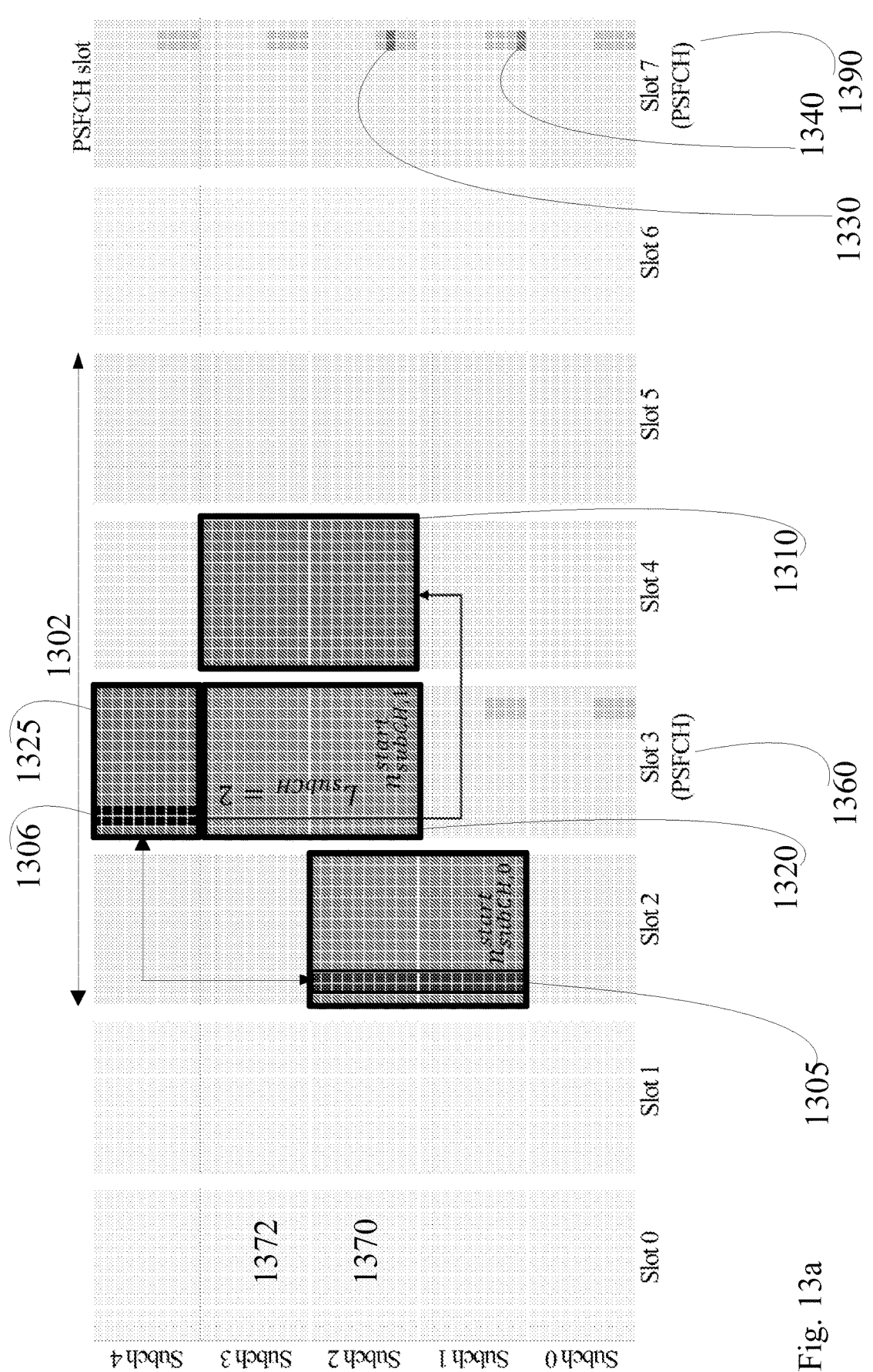
FIG. 13*a* shows, by way of example, illustration of garbage resources, additional resources and protected resources.

FIG. 13a shows, by way of example, illustration of garbage resources, additional resources and protected resources. Slots 2 to 5 represent the bundling window 1302 and are associated with PSFCH in the slot 7 1390. The additional resources 1325 are sent in the same time slot 1360 as the garbage resources 1320, and in a contiguous subchannel with respect to the ending subchannel 1372 of the garbage resources 1320. The garbage resources 1320 cover the subchannels 2 and 3, that is, subchannels 1370 and 1372. The additional resources 1325 are indicated in the modified SCI 1305. Transmission in the additional resources 1325 comprise a reservation for the protected resources 1310. The secret resources 1310 are announced in the SCI 1306 of the additional resources 1325.

Since the attacker attacks the garbage resources 1320, the attacker, which is a half-duplex device, cannot receive any sidelink communication during the attack. Thus, the attacker is not aware of the transmission of the additional resources 1325, and hence of the content of the SCI 1306 of the additional resources 1325. Thus, the attacker is not aware of the reservation of the protected resources 1310.

Other apparatuses configured to communicate via sidelink resources are able to receive the SCI 1306 of the additional resources 1325 when performing sensing. Thus, the other apparatuses may avoid collisions with the secret resources 1310.

Resource blocks 1330 depict the PSFCH resources associated with the protected PSSCH 1310, and the resource blocks 1340 depict the PSFCH resources associated with the garbage PSSCH 1320.

The second UE(s) may receive transmissions from the first UE on the additional resources 1325. The second UE(s) may receive the SCI 1306 of the additional resources 1325, wherein the SCI 1306 announces the reservation of the protected sidelink resources 1310. The attacker may vainly attack the garbage resources at the same time.

The first UE may transmit the sidelink payload data to the second UE(s) on the protected sidelink resources 1310 indicated in the SCI 1306 of the additional resources 1325, which is not receivable by the attacker.

The second UE (RX-UE) or a set of second UEs may provide acknowledgement signalling, e.g. the HARQ feedback, of the protected PSSCH on feedback resources, e.g. PSFCH resources 1340, that are associated with the garbage PSSCH 1320. This will prevent a third UE, i.e. the attacker, which may be a hidden node for the first device, from inferring on future PSSCH resources by eavesdropping the PSFCH sent by the second device (RX-UE) or a set of second devices.

Figure 13B:
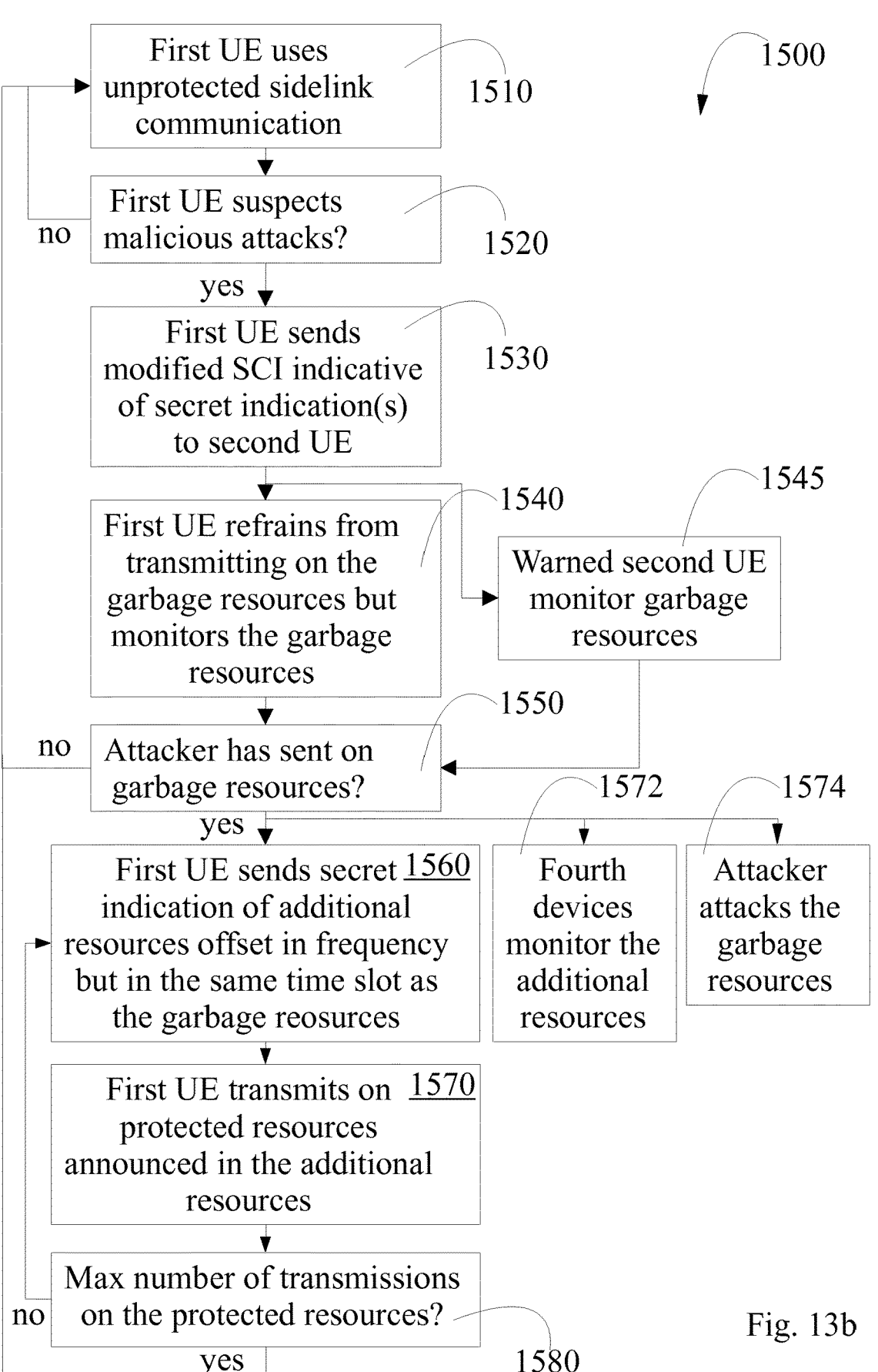
FIG. 13*b* shows, by way of example, a flowchart of a method.

FIG. 13b shows, by way of example, a flowchart of a method 1500 performed by an apparatus which is the first UE. The first UE is configured 1510 to communicate with at least one second apparatus or second UEs via unprotected sidelink resources. The unprotected sidelink resources are associated with unmodified sidelink control information, that is, the original SCI. In at least some embodiments, the first UE and the at least one second UE are half-duplex apparatuses. A half-duplex apparatus cannot receive and transmit at the same time.

The first UE may suspect 1520 malicious attacks. For example, the first UE may detect a possibility of a malicious attack on the sidelink resources e.g. based on observations of inconsistent channel conditions versus number of consecutive NACKs received from the second UE. For example, even though the channel conditions are good, there may be a high number of NACKs, which may indicate an attack. Alternatively, it may be decided by higher layers that the UE will modify the SCI in order to protect against possible attacks. In at least some embodiments, the first UE may receive indication of detection of malicious attacks from at least one second UE.

The first UE transmits 1530 a modified SCI to the second UE. The modified SCI, or a spoof SCI, is indicative of at least one secret indication. The at least one secret indication may comprise the first indication secretly informing the second UE that the first UE will monitor the garbage resources.

The first UE changes secretly its behavior. The first UE may refrain 1540 from transmitting on the garbage resources, i.e. the sidelink resources associated with the unmodified SCI. The first UE may monitor 1540 transmissions on the garbage resources in order to detect attacks and verify the presence of a third UE, i.e. the attacker, that will send malicious collisions on the sidelink resources indicated in the unmodified SCI. Verification of the presence of the attacker is based on detecting the attacker transmitting on the sidelink resources that have been originally reserved by the first UE.

The second UE or a set of second UEs may be warned by the reception of the modified SCI. The modified SCI will appear as a normal SCI to the attacker. The first UE may warn the second UE or a set of second UEs about potential attacks on the sidelink resources associated with the unmodified SCI. The second UE may then monitor 1545 these garbage PSSCH resources to verify whether the attacker is sending malicious collisions on the sidelink resources indicated in the unmodified SCI. Since the second UE has been warned about potential attacks on the sidelink resources indicated in the unmodified SCI, the second UE is aware that the first UE will not transmit on those sidelink resources, that is, on the garbage resources. If the second UE detects any transmission on those garbage resources originally reserved by the first UE, it knows that those transmissions are malicious collisions caused by the attacker.

If it is detected 1550 that the attacker, or the third UE, has sent transmissions on the garbage resources, the first UE may send 1560 secret indication of additional resources to the second UE. The additional resources are offset in frequency but in the same time slot as the garbage resources. In at least some embodiments, the first UE may send the secret indication of additional resources to the second UE even without detecting the attacker sending on the garbage resources.

Fourth devices, that is, the legitimate surrounding UEs configured to communicate via sidelink resources, may perform sensing and monitor 1574 the additional resources. The attacker (third device) may attack 1574 the garbage resources and thus cannot receive the SCI of the additional resources.

SCI of the additional resources is indicative of resource allocation of protected resources, which are different than the originally reserved resources, i.e. garbage resources. The first UE may transmit 1570 to the second UE on the protected resources announced in the SCI of the additional resources. Since the fourth devices are aware of the reservation of the protected resources, the fourth devices will avoid unintentional collisions with the protected resources.

A maximum number may be determined for the transmissions on the protected resources, e.g. via configuration. If it is detected 1580 that a configurable number of protected transmissions on the protected resources have been transmitted, the first UE may decide to switch back to normal or unprotected transmission scheme, e.g. unprotected PSSCH transmission scheme. Alternatively, higher layers may select to discontinue the protected sidelink communication scheme.

Figure 14:
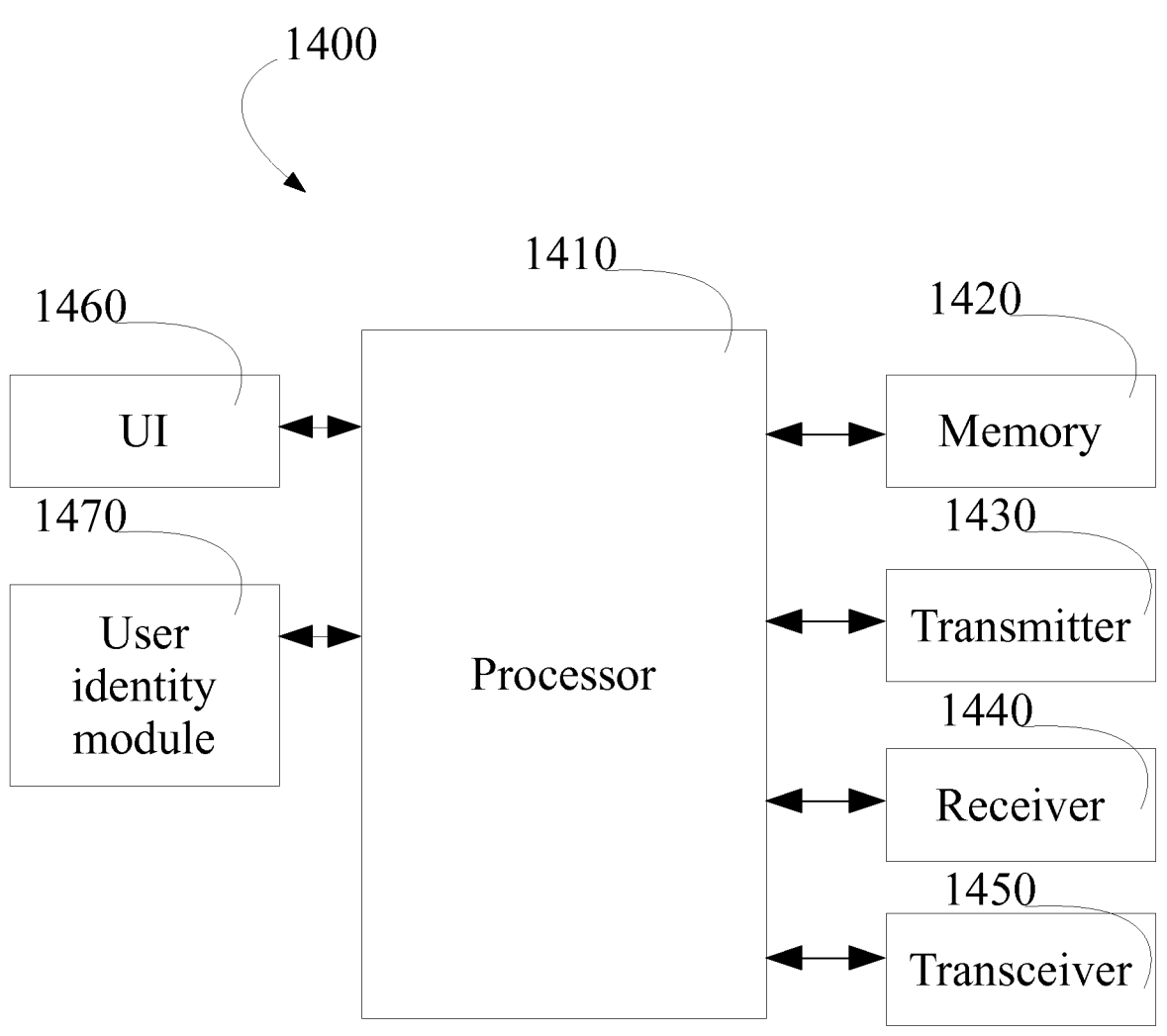
FIG. 14 shows, by way of example, a block diagram of an apparatus.

FIG. 14 shows, by way of example, a block diagram of an apparatus capable of performing the method(s) as disclosed herein. Illustrated is device 1400, which may comprise, for example, a mobile communication device such as a TX-UE 210 of FIG. 2 or RX-UE 220 of FIG. 2. Comprised in device 1400 is processor 1410, which may comprise, for example, a single- or multi-core processor wherein a single-core processor comprises one processing core and a multi-core processor comprises more than one processing core. Processor 1410 may comprise, in general, a control device. Processor 1410 may comprise more than one processor. Processor 1410 may be a control device. A processing core may comprise, for example, a Cortex-A8 processing core manufactured by ARM Holdings or a Steamroller processing core designed by Advanced Micro Devices Corporation. Processor 1410 may comprise at least one Qualcomm Snapdragon and/or Intel Atom processor. Processor 1410 may comprise at least one application-specific integrated circuit, ASIC. Processor 1410 may comprise at least one field-programmable gate array, FPGA. Processor 1410 may be means for performing method steps in device 1400. Processor 1410 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a user equipment, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 1400 may comprise memory 1420. Memory 1420 may comprise random-access memory and/or permanent memory. Memory 1420 may comprise at least one RAM chip. Memory 1420 may comprise solid-state, magnetic, optical and/or holographic memory, for example. Memory 1420 may be at least in part accessible to processor 1410. Memory 1420 may be at least in part comprised in processor 1410. Memory 1420 may be means for storing information. Memory 1420 may comprise computer instructions that processor 1410 is configured to execute. When computer instructions configured to cause processor 1410 to perform certain actions are stored in memory 1420, and device 1400 overall is configured to run under the direction of processor 1410 using computer instructions from memory 1420, processor 1410 and/or its at least one processing core may be considered to be configured to perform said certain actions. Memory 1420 may be at least in part external to device 1400 but accessible to device 1400.

Device 1400 may comprise a transmitter 1430. Device 1400 may comprise a receiver 1440. Transmitter 1430 and receiver 1440 may be configured to transmit and receive, respectively, information in accordance with at least one cellular or non-cellular standard. Transmitter 1430 may comprise more than one transmitter. Receiver 1440 may comprise more than one receiver. Transmitter 1430 and/or receiver 1440 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 1400 may comprise a near-field communication, NFC, transceiver 1450. NFC transceiver 1450 may support at least one NFC technology, such as NFC, Bluetooth, Wibree or similar technologies.

Device 1400 may comprise user interface, UI, 1460. UI 1460 may comprise at least one of a display, a keyboard, a touchscreen, a vibrator arranged to signal to a user by causing device 1400 to vibrate, a speaker and a microphone. A user may be able to operate device 1400 via UI 1460, for example to accept incoming telephone calls, to originate telephone calls or video calls, to browse the Internet, to manage digital files stored in memory 1420 or on a cloud accessible via transmitter 1430 and receiver 1440, or via NFC transceiver 1450, and/or to play games.

Device 1400 may comprise or be arranged to accept a user identity module 1470. User identity module 1470 may comprise, for example, a subscriber identity module, SIM, card installable in device 1400. A user identity module 1470 may comprise information identifying a subscription of a user of device 1400. A user identity module 1470 may comprise cryptographic information usable to verify the identity of a user of device 1400 and/or to facilitate encryption of communicated information and billing of the user of device 1400 for communication effected via device 1400.

Processor 1410 may be furnished with a transmitter arranged to output information from processor 1410, via electrical leads internal to device 1400, to other devices comprised in device 1400. Such a transmitter may comprise a serial bus transmitter arranged to, for example, output information via at least one electrical lead to memory 1420 for storage therein. Alternatively to a serial bus, the transmitter may comprise a parallel bus transmitter. Likewise processor 1410 may comprise a receiver arranged to receive information in processor 1410, via electrical leads internal to device 1400, from other devices comprised in device 1400. Such a receiver may comprise a serial bus receiver arranged to, for example, receive information via at least one electrical lead from receiver 1440 for processing in processor 1410. Alternatively to a serial bus, the receiver may comprise a parallel bus receiver.

Processor 1410, memory 1420, transmitter 1430, receiver 1440, NFC transceiver 1450, UI 1460 and/or user identity module 1470 may be interconnected by electrical leads internal to device 1400 in a multitude of different ways. For example, each of the aforementioned devices may be separately connected to a master bus internal to device 1400, to allow for the devices to exchange information. However, as the skilled person will appreciate, this is only one example and depending on the embodiment various ways of interconnecting at least two of the aforementioned devices may be selected.

The invention claimed is:

1. An apparatus which is a first apparatus, comprising: at least one processor; and at least one memory storing instructions that, when executed by the at least one processor, cause the apparatus at least to:

communicate with at least one second apparatus via sidelink resources associated with unmodified sidelink control information;

detect a possibility of a malicious attack on the sidelink resources or receiving an instruction to modify a sidelink control information message; and transmit, responsive to the detecting of the possibility of the malicious attack or to the receiving of the instruction, to the at least one second apparatus, a modified sidelink control information message indicative of at least one secret indication, wherein the at least one secret indication is indicative of a secret sidelink resource allocation, wherein the secret sidelink resources are different from the sidelink resources associated with the unmodified sidelink control information.

2. The apparatus of claim 1, wherein the at least one processor; and the at least one memory storing instructions that, when executed by the at least one processor, further cause the apparatus at least to:

select the secret sidelink resource allocation based on resource sensing.

3. The apparatus of claim 1, wherein the modified sidelink control information message is indicative of a configurable offset of the secret sidelink resource allocation compared to an originally indicated sidelink resources in the unmodified sidelink control information.

4. The apparatus of claim 3, wherein the configurable offset is given with respect to a time resource indicator and/or with respect to a frequency resource indicator.

5. The apparatus of claim 1, wherein the at least one processor; and the at least one memory storing instructions that, when executed by the at least one processor, further cause the apparatus at least to:

transmit to the at least one second apparatus transmission (s) on the secret sidelink resources.

6. The apparatus of claim 5, wherein the at least one processor; and the at least one memory storing instructions that, when executed by the at least one processor, further cause the apparatus at least to:

receive, from the at least one second apparatus, acknowledgement signalling of a reception(s) on the secret sidelink resources on feedback resources associated with the sidelink resources associated with the unmodified sidelink control information.

7. The apparatus of claim 1, wherein the secret indication is indicative of:

an additional resource allocation, wherein the additional resources are offset in frequency domain and a time slot of the additional resources is the same as time slot of the sidelink resources associated with unmodified sidelink control information; and instruction to decode a sidelink control information of the additional resource allocation, wherein the sidelink control information of the additional resource allocation is indicative of a protected sidelink resource allocation, wherein the protected sidelink resources are different from the sidelink resources associated with the unmodified sidelink control information.

8. The apparatus of claim 7, wherein the at least one processor; and the at least one memory storing instructions that, when executed by the at least one processor, further cause the apparatus at least to:

transmit, to the at least one second apparatus, transmission(s) on the protected sidelink resources announced in the sidelink control information of the additional resources.

9. The apparatus of claim 8, wherein the at least one processor; and the at least one memory storing instructions that, when executed by the at least one processor, further cause the apparatus at least to:

receive, from the at least one second apparatus, acknowledgement signalling of a reception(s) on the protected sidelink resources on feedback resources associated with the sidelink resources associated with the unmodified sidelink control information.

10. The apparatus of claim 7, wherein the sidelink control information of the additional sidelink resources is:

receivable by the at least one second apparatus and other legitimate apparatuses configured to communicate via the sidelink resources; and not receivable by a third apparatus configured to attack transmissions from the first apparatus to the at least one second apparatus, wherein the third apparatus is a half-duplex apparatus.

11. The apparatus of claim 1, wherein the at least one processor; and the at least one memory storing instructions that, when executed by the at least one processor, further cause the apparatus at least to:

refrain from transmitting on the sidelink resources associated with the unmodified sidelink control information.

12. An apparatus which is a second apparatus, comprising: at least one processor; and at least one memory storing instructions that, when executed by the at least one processor, cause the apparatus at least to:

communicate with a first apparatus via sidelink resources associated with unmodified sidelink control information; and receive, from the first apparatus, a modified sidelink control information message indicative of at least one secret indication, wherein the at least one secret indication is indicative of a secret sidelink resource allocation, wherein the secret sidelink resources are different from the sidelink resources associated with the unmodified sidelink control information.

13. The apparatus of claim 12, wherein the modified sidelink control information message is indicative of a configurable offset of secret sidelink resource allocation compared to an originally indicated sidelink resources in the unmodified sidelink control information.

14. The apparatus of claim 13, wherein the configurable offset is given with respect to a time resource indicator and/or with respect to a frequency resource indicator.

15. The apparatus of claim 12, wherein the at least one processor; and the at least one memory storing instructions that, when executed by the at least one processor, further cause the apparatus at least to:

receive, from the first apparatus, reception(s) on the secret sidelink resources;

transmit acknowledgement signalling of the reception(s) on the secret sidelink resource on feedback resources associated with the sidelink resources associated with the unmodified sidelink control information.

16. The apparatus of claim 12, wherein the secret indication is indicative of:

an additional resource allocation, wherein additional resources are offset in frequency domain and a time slot of the additional resources is the same as a time slot of the sidelink resources associated with unmodified sidelink control information; and instruction to decode a sidelink control information of the additional resource allocation, wherein the sidelink control information of the additional resource allocation is indicative of a protected sidelink resource allocation, wherein protected sidelink resources are different from the sidelink resources associated with the unmodified sidelink control information.

17. A method comprising:

detecting, by a first apparatus caused to communicate with at least one second apparatus via sidelink resources associated with unmodified sidelink control information, a possibility of a malicious attack on the sidelink resources or receiving an instruction to modify a sidelink control information message;

transmitting, responsive to the detecting of the possibility of the malicious attack or to the receiving of the instruction, to the at least one second apparatus, a modified sidelink control information message indicative of at least one secret indication, wherein the at least one secret indication is indicative of a secret sidelink resource allocation, wherein the secret sidelink resources are different from the sidelink resources associated with the unmodified sidelink control information.

18. A non-transitory computer readable medium comprising program that, when executed by an apparatus, cause the apparatus to perform at least the following:

detecting, by the first apparatus caused to communicate with at least one second apparatus via sidelink resources associated with unmodified sidelink control information, a possibility of a malicious attack on the sidelink resources or receiving an instruction to modify a sidelink control information message;

transmitting, responsive to the detecting of the possibility of the malicious attack or to the receiving of the instruction, to the at least one second apparatus, a modified sidelink control information message indicative of at least one secret indication, wherein the at least one secret indication is indicative of a secret sidelink resource allocation, wherein the secret sidelink resources are different from the sidelink resources associated with the unmodified sidelink control information.

* * * * *